United States Patent

Beck et al.

Patent Number: 5,807,049
Date of Patent: Sep. 15, 1998

[54] SPREADING ANCHOR WITH UNDERCUT-FORMING CUTTING MEANS

[75] Inventors: Hermann Beck, Feldkirch-Tisis, Austria; Helmut Gassner, Triesenberg, Liechtenstein; Markus Hartmann, Frastanz, Austria; Susanne Kossian, Feldkirch, Austria; Rainer Kussmaul, Thüringen, Austria; Reinhard Lins, Sevelen, Switzerland; Erich Wisser, Bregenz; Thomas Doppelbauer, Feldkirch, both of Austria

[73] Assignee: Hilti Aktiengesellschaft, Schaan, Liechtenstein

[21] Appl. No.: 891,237

[22] Filed: Jul. 10, 1997

[30] Foreign Application Priority Data

Jul. 10, 1996 [DE] Germany ............... 196 27 774.4

[51] Int. Cl.$^6$ ................. F16B 13/04; F16B 13/06
[52] U.S. Cl. ................. 411/31; 411/55; 411/60
[58] Field of Search .................. 411/31, 55, 60, 411/61, 70, 72, 30

[56] References Cited

U.S. PATENT DOCUMENTS

| 4,702,654 | 10/1987 | Frischmann . | |
| 4,789,284 | 12/1988 | White . | |
| 4,904,135 | 2/1990 | Barthomeuf et al. | 411/61 X |
| 4,971,494 | 11/1990 | Gauthier et al. | 411/61 X |
| 5,263,803 | 11/1993 | Anquetin | 411/31 |
| 5,332,346 | 7/1994 | Shinjo | 411/31 |

FOREIGN PATENT DOCUMENTS 0724085  7/1996  European Pat. Off. .

OTHER PUBLICATIONS

European Search Report, No. EP 97 810 333.1 dated Sep. 29, 1997.
English language abstract of EP–A–0 724 085.

*Primary Examiner*—Neill R. Wilson
*Attorney, Agent, or Firm*—Anderson, Kill & Olick, P.C.

[57] ABSTRACT

A spreading anchor including an anchor rod having a stem (2) provided at its front end with a cone (3) which widens toward its free end, and a sleeve (5) which surrounds the stem (2), is axially displaceable along the anchor rod, and has a plurality of cutting tabs (6) separated from each other by axially extending slots (70, extending from a hinge point (9) in a direction of the cone (3), and having cutters (10), in regions of their free front ends, with the cutting tabs expanding radially upon the sleeve (5) being pushed onto the cone (3), with the sleeve (5) having at its free end in a region of the cutting tabs (6), and axially extending folded-over section (8) having an axial length (1) corresponding approximately to the length of the axial slots, and with the hinge (9) being located in the transition region between the folded-over section (8) and the sleeve outer surface.

8 Claims, 1 Drawing Sheet

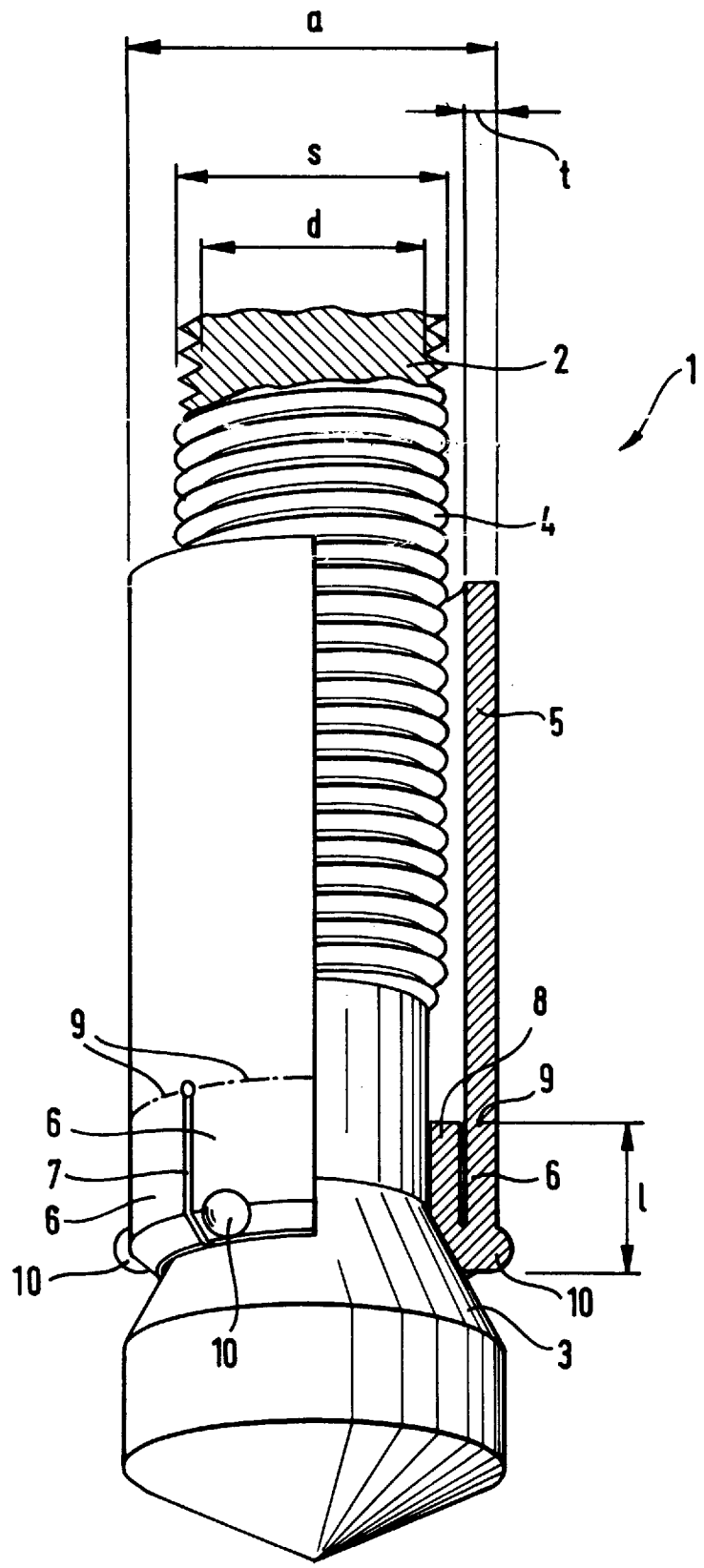

SPREADING ANCHOR WITH UNDERCUT-FORMING CUTTING MEANS

BACKGROUND OF THE INVENTION

1. Field of the Invention

The present invention relates to a self-cutting spreading anchor including an anchor rod having a stem provided at its front end with a cone which widens toward its free end, and a sleeve which surrounds the stem, is axially, displaceable along the anchor rod, and has a plurality of cutting tabs separated from each other by axially extending slots and extending from a hinge point in a direction of the cone, and having, in regions of their free front ends, cutters, with the cutting tabs expanding radially upon the sleeve being pushed onto the cone.

2. Description of the Prior Art

In anchoring technology, it is often necessary to form connections which are expansion pressure-free to the greatest possible extent. In particular, with small edge and axis distances, the anchoring with conventional expansion dowels can result in fracture or even in stratification of the subsoil or the ground. To prevent this, there are provided anchoring systems in which a special connection or anchoring element is form-locking anchored in a receiving bore. To this end, a cylindrical receiving bore is provided at a predetermined depth with an undercut. An anchoring element, which is inserted in the pre-formed bore, includes an anchor rod provided with a cone and extending through an axial through-bore of a sleeve provided with expanding segments which swung out, upon relative displacement of the sleeve and the anchor rod, and engage in the undercut.

In most cases for forming an undercut, a special tool, which includes abrasive cutters which are eccentrically arranged in the receiving bore and with which an undercut is formed in the bore wall, is required. Also known spreading anchors which automatically form an undercut during the setting process.

A spreading anchor having integral undercut-forming cutting means is disclosed in U.S. Pat. No. 4,702,654. The spreading anchor disclosed in U.S. Pat. No. 4,702,654 includes a sleeve having, at its front end facing in the setting direction, cutting tabs which extends from a hinge point towards a cone provided at the front end of the anchor rod. The cutting tabs expand radially upon the sleeve being pushed onto the cone which is supported on the bottom of the receiving bore. With the sleeve being rotated, the cutters, which are provided on the cutting tabs which are pressed against the bore wall, mill an undercut in the bore wall. The sleeve is pressed onto the cone and is rotated until the cutting tabs completely expand, and an undercut with a predetermined depth is formed.

The sleeve is usually formed of steel and is manufactured by machining which is relatively expensive. In particular, the manufacturing process should meet high demands required by manufacturing of the cutting tabs and the hinge about which the cutting tabs expand. Because of a high load applied to the cutting tabs during the formation of the undercut, the wall thickness of the sleeve should be relatively large. This results in that the receiving bore must have a diameter which would be relatively large in comparison with that of the anchor rod. The cutters, which are provided on the cutting tabs, are formed as hard metal pins located in the region of the free ends of the cutting tabs and soldered there. During the formation of the recess, the hard metal pins can fall out from their recesses in the cutting tabs. This results in inadequate cutting properties of the cutting tabs and in the formation of an undercut which would not have a predetermined depth and a desired radial uniformity. Also known are spreading anchors in which the cutters are formed as hardened teeth provided on the free ends of the cutting tabs. However, the manufacturing of the hardened teeth is rather expensive because the hinge in particular should not be brittle in order to insure the required swinging out of the cutting tabs.

Accordingly, an object of the present invention is to eliminate the drawbacks of conventional self-cutting spreading anchors and to provide a spreading anchor which automatically forms an undercut during the setting process, with the ration of the diameter of the receiving bores to the diameter of the anchor rods being smaller than that for conventional spreading anchors. The sleeve with the cutting tabs should be able to be manufactured in simple and cost-effective manner, expensive machining processes should be eliminated. The cutters on the cutting tabs of the sleeve should provide for a uniform and reliable formation of an undercut with a predetermined depth. The loss of cutters should be prevented. The manufacture of the cutters should be simple, and any brittleness in the hinge should be eliminated.

SUMMARY OF THE INVENTION

The solution of the above-listed objects is achieved by providing a self-cutting spreading anchor the sleeve of which has, at its free end in the region of the cutting tabs, an axially extending folded-over section having a length corresponding approximately to the length of the slots, which separate the cutting tabs, with the hinge being located in a transition region between the folded-over section and the outer surface of the sleeve. The self-cutting spreading anchor according to the present invention includes an anchor rod having a stem provided at its front end with a cone which widens toward its free end. The stem is surrounded by a sleeve axially displaceable along the anchor rod. The sleeve has a plurality of cutting tabs separated from each other by axially extending slots and extending from a hinge point in a direction of the cone. The cutting tabs have, in regions of their free front ends, cutters. The cutting tabs expand radially upon the sleeve being pushed onto the cone. The sleeve has at its end in a region of the cutting tabs, an axially extending folded-over section. The axial length of the folded-over section corresponds approximately to the length of the axial slots. The hinge point is located in the transition region between the folded-over section of the sleeve and the sleeve outer surface. The sleeve is folded over in the region of its cutting tabs. As a result, the cutting tabs have a thickness twice exceeding the sleeve thickness. Therefore, the thickness of the sleeve can be made smaller, without adversely affecting the rigidity of the cutting tabs which, during the formation of the undercut, are subjected to very large radial forces and, because of the rotation of the sleeve, to particularly very large forces acting in the circumferential direction. Because the sleeve is formed with a reduced wall thickness, it is economical in manufacturing. The hinge, about which the cutting tabs expand radially, is provided, as discussed above, in the transition region between the folded-over section and the sleeve outer section and does not require any further processing or treatment. Circumferential radial grooves or recesses can be eliminated. Thereby, the manufacturing of the sleeve is further simplified. The costly machining processes are thus eliminated.

According to an advantageous embodiment of the present invention, the folded-over section is located inside the sleeve and surrounds the stem of the anchor rod. The minimal required diameter of the receiving bore is selected in accordance with the largest outer diameter of the spreading anchor. Because the free front end of the sleeve is folded over inward, the outer diameter of the sleeve is retained along the sleeve longitudinal extent. Therefore, the diameter of the receiving bore can be only slightly larger than the diameter of the sleeve.

Advantageously, the stem has, in its region adjoining the folded-over section of the sleeve, a diameter which is smaller than the diameter of the adjacent backward extending stem section. In this way, the inward folded-over section of the sleeve is received in the anchor rod region having the smaller diameter. This provides for the best possible matching of the anchoring rod diameter with the inner diameter of the sleeve. Thereby, the diameter of the stem can be reduced to the roof diameter of the anchor rod. In this way, the standard calculated tensioning characteristic of the anchor rod is reliable maintained.

A particularly good use of the bore space takes place when the ration of the largest sleeve diameter to the outer diameter of the anchor rod is from about 1.3 to about 1.6.

The advantages of the self-cutting spreading anchor according to the present invention, from the manufacturing point of view, can be increased when the sleeve is formed as a sheet metal stamped piece. The sheet metal stamped pieces are adapted particularly good for mass manufacturing processes. This reduces the production costs even further.

In order to further simplify the manufacturing of the self-cutting spreading anchors according to the present invention, the cutters are formed as hardened projections provided on the free ends of the cutting tabs and secured on circumferential surfaces of the cutting tabs. Preferably the cutting projections are formed as weld points or as welded spring steel bits. The weld points, which are formed on the circumferential surfaces of the cutting tabs, need not be further hardened. The same applies to the spring steel bits which became hardened by the welding process. Therefore, only a short, locally limited heat treatment of the cutting tabs takes place in order to reliably prevent brittle in the hinge. The cutters, which are formed according to the present invention are material-lockingly connected with the cutting tabs. This connection is more stable than the form-locking connection of the hard metal pins in the recesses formed in the outer surfaces of the cutting tabs and which form-locking connection is not noticeably improved by the pins being additionally soldered. Therefore, there exists a danger in the conventional self-cutting spreading anchors that the cutters, because of a high load applied to them during the formation of the undercut, can become loose and fall out. The weld points and/or the welded spring steel bits can be further treated by metal forming, e.g., by embossing to form the cutters with appropriate effective cutting angle, wedge angle and free angle. However, as a rule, no further treatment of the weld points and/or of the spring steel bits is necessary.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

Single Figure shows a partially cross-sectional view of a spreading anchor according to the present invention with undercut-forming cutting means.

DETAILED DESCRIPTION OF THE PREFERRED EMBODIMENT

A spreading anchor according to the present invention, which is provided with undercut-forming cutting means and is generally designated with a reference numeral 1, includes an anchor rod having a stem 2 and a cone 3 connected with the stem 2. The cone 3 widens toward its free end. The anchor rod is formed as a threaded rod and has an outer thread 4 extending up to its rear end. The thread 4 serves as a loading means and has a root diameter d. The outer diameter of the anchor rod, which is measured over the thread flanks, is designated with s. The stem 2 is surrounded by a sleeve 5 which is displaced along the stem 2 and is formed, preferably, as a sheet metal stamped piece. The sleeve 5 is provided at its front end, adjacent to cone 3, with cutting tabs 6 separated from each other with axially extending slots 7.

On the outer sides of the free front ends of the cutting tabs 6, cutters 10 are arranged. According to the embodiment of the inventive spreading anchor, which is shown in the drawing, the cutters 10 are formed by weld points provided on the outer sides of the cutting tabs 6. Instead of the weld points, the cutters 10 can be formed, e.g., by spring steel bits welded on the outer sides of the cutting tabs 6. The spring steel bits are hardened during the welding process. In the region of the cutting tabs 6, the sleeve 5 has a back-up or folded-over section 8. The length of the folded-over section 8 corresponds to the length of a slot 7. Thus, the cutting tabs 6 have a thickness which is twice of the thickness of the sleeve 5. The cutting tabs 6 expands radially about a hinge 9 when the sleeve 5 is pushed onto the cone 3. The length of the folded-over section 8 is so selected that the hinge 9 is located in a transition region between a portion of the sleeve 5 having a double thickness and a portion of sleeve 5 having a single thickness. The cutter 10 form an undercut in a cylindrical anchor-receiving bore when the sleeve 5 is rotated while being pushed onto the cone 3.

The stem 2 of the anchor rod has a tapering region 11 adjoining the folded-over section 8 of the sleeve 5. At that, the diameter of the tapered region 11 is reduced maximum to the root diameter of the thread 4. The thickness of the sleeve 5 is so selected that the ratio of the largest diameter of the sleeve 5 to the outer diameter 5 of the anchor rod equals from about 1.3 to about 1.6. A particularly good utilization of the space of the receiving bore takes place when the embodiment of a spreading anchor with undercut-forming cutting means which is shown in the drawing and in which the folded-over section 8 is provided in the interior of the sleeve 5, is used. It should be understood that the folded-over section can also be formed outwardly of the sleeve so that the folded-over section, which forms the cutting tabs, projects beyond the sleeve diameter.

A spreading anchor according to the present invention having undercut-forming cutting means, the structure of which was discussed on the basis of an embodiment shown in the drawing, can be also a spreading anchor of the type which requires that the anchor rod be supported, during the setting process, against the bottom of the receiving bore in order to be able to push the rotating sleeve onto the cone. However, a spreading anchor can be provided the setting of which does not depend on a bore depth and when the anchor rod is freely suspended above the bottom of the receiving bore while the sleeve is pushed over the cone. The rotation of the sleeve is effected, e.g., with a driver provided on the anchor rod and engaging in the axial slots between the cutting tabs, with the anchor rod being rotated.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An undercut-selfcutting spreading anchor, comprising an anchor rod having a stem (2) provided at a front end thereof with a cone (3) which widens toward a free end thereof, and a sleeve (5), which surrounds the stem (2) and is adapted to be rotated while being axially displaceable along the anchor rod, and has a plurality of cutting tabs (6) separated from each other by axially extending slots (7), extending from a hinge point (9) in a direction of the cone (3), and having cutters (10), in regions of free front ends thereof, the cutting tabs expanding radially upon the rotating sleeve (5) being pushed onto the cone (3) rotable together with the sleeve (5), the sleeve (5) having at a free end thereof in a region of the cutting tabs (6), an axially extending folded-over section (8) having an axial length (1) corresponding approximately to a length of the axial slots (7), and the hinge point (9) being located in a transition region between the folded-over section (8) and an outer surface of the sleeve (5).

2. An undercut-selfcutting spreading anchor according to claim 1, wherein the folded-over section (8) is provided inside the sleeve (5) and surrounds the stem (2) of the anchor rod.

3. An undercut-selfcutting spreading anchor according to claim 1, wherein the sleeve (5) is formed as a sheet metal stamped piece.

4. An undercut-selfcutting spreading anchor, comprising an anchor rod having a stem (2) provided at a front end thereof with a cone (3) which widens toward a free end thereof, and a sleeve (5) which surrounds the stem (2), is axially displaceable along the anchor rod, and has a plurality of cutting tabs (6) separated from each other by axially extending slots (7), extending from a hinge point (9) in a direction of the cone (3), and having cutters (10), in regions of free front ends thereof, the cutting tabs expanding radially upon the sleeve (5) being pushed onto the cone (3), the sleeve (5) having at a free end thereof in a region of the cutting tabs (6), an axially extending folded-over section (8) having an axial length (1) corresponding approximately to a length of the axial slots (7), and the hinge point (9) being located in transition region between the folded-over section (8) and an outer surface of the sleeve (5), wherein the folded-over section (8) is provided inside the sleeve (5) and surrounds the stem (2) of the anchor rod, and wherein the stem (2) has, in a region (11) thereof adjoining the folded-over section (8) of the sleeve (5), a diameter which is smaller than a diameter of an adjacent backward extending section of the stem (2).

5. An undercut-selfcutting spreading anchor according to claim 4, wherein the diameter of the stem section (11) adjoining the folded-over section (8) equals maximum to a root diameter (d) of a thread formed on the anchor rod.

6. An undercut-selfcutting spreading anchor according to claim 4, wherein the ration of a largest outer diameter (a) of the sleeve (5) to an outer diameter (5) of the stem (2) is from about 1.3 to about 1.6.

7. An undercut-selfcutting spreading anchor, comprising an anchor rod having a stem (2) provided at a front end thereof with a cone (3) which widens toward a free end thereof, and a sleeve (5) which surrounds the stem (2), is axially displaceable along the anchor rod, and has a plurality of cutting tabs (6) separated from each other by axially extending slots (7), extending from a hinge point (9) in a direction of the cone (3), and having cutters (10), in regions of free front ends thereof, the cutting tabs expanding radially upon the sleeve (5) being pushed onto the cone (3), the sleeve (5) having at a free end thereof in a region of the cutting tabs (6), an axially extending folded-over section (8) having an axial length (1) corresponding approximately to a length of the axial slots (7), and the hinge point (9) being located in a transition region between the folded-over section (8) and an outer surface of the sleeve (5), wherein cutters are formed as hardened projections (10) provided on free ends of the cutting tabs (6) and secured on circumferential surface of the cutting tabs.

8. An undercut-selfcutting spreading anchor according to claim 7, wherein the hardened projections are formed by weld points.

* * * * *